(12) United States Patent
Lin et al.

(10) Patent No.: US 9,060,241 B2
(45) Date of Patent: Jun. 16, 2015

(54) PERSONAL COMMUNICATION DEVICE AND METHOD FOR PRESENTING DIGITAL ITEMS THEREOF

(71) Applicant: HTC Corporation, Taoyuan County (TW)

(72) Inventors: Jen-Chiun Lin, Taoyuan County (TW); Tai-Ling Lu, Taoyuan County (TW); Cheng-Shiun Jan, Taoyuan County (TW); Te-Chuan Liu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 248 days.

(21) Appl. No.: 13/680,117

(22) Filed: Nov. 19, 2012

(65) Prior Publication Data
US 2014/0141719 A1    May 22, 2014

(51) Int. Cl.
*H04B 7/00* (2006.01)
*H04W 4/00* (2009.01)
*H04W 4/20* (2009.01)

(52) U.S. Cl.
CPC .............. *H04W 4/008* (2013.01); *H04W 4/203* (2013.01)

(58) Field of Classification Search
CPC ............................... H04W 48/16; H04W 4/008
USPC ......... 455/41.2, 41.3, 422.1, 410, 414.1, 411; 370/254, 312, 338
See application file for complete search history.

(56) References Cited

U.S. PATENT DOCUMENTS

| | | | |
|---|---|---|---|
| 7,853,207 B2 | 12/2010 | Harada et al. | |
| 7,876,701 B2 * | 1/2011 | Li et al. | 370/252 |
| 7,882,244 B2 | 2/2011 | Helvick | |
| 8,462,874 B2 * | 6/2013 | Subramanian et al. | 375/285 |
| 8,594,632 B1 * | 11/2013 | Azizi et al. | 455/411 |
| 8,812,657 B2 * | 8/2014 | Mallik et al. | 709/224 |
| 2006/0234631 A1 | 10/2006 | Dieguez | |
| 2010/0151887 A1 | 6/2010 | Bobier | |
| 2011/0047384 A1 * | 2/2011 | Jacobs et al. | 713/176 |
| 2012/0185583 A1 * | 7/2012 | Wu et al. | 709/224 |
| 2014/0066058 A1 * | 3/2014 | YU et al. | 455/434 |

FOREIGN PATENT DOCUMENTS

| | | |
|---|---|---|
| CN | 102202095 | 9/2011 |
| CN | 102571910 | 7/2012 |
| CN | 102647368 | 8/2012 |

(Continued)

OTHER PUBLICATIONS

"Office Action of Taiwan Counterpart Application", issued on Nov. 3, 2014, p. 1-p. 7.

(Continued)

*Primary Examiner* — Sonny Trinh
(74) *Attorney, Agent, or Firm* — Jianq Chyun IP Office

(57) ABSTRACT

A method for presenting digital items is provided. The method is executed by a first PCD and includes the following steps. Detect the existence of one or more second PCDs by the first PCD. Update the state of each said second PCD according to the detection. Rank the order of the one or more second PCDs according to the state, wherein the order of the second PCDs whose state is present is higher than the order of the second PCDs whose state is absent. Present one or more digital items according to the order of the one or more second PCDs.

20 Claims, 4 Drawing Sheets

(56) References Cited

FOREIGN PATENT DOCUMENTS

| WO | 2008132241 | 11/2008 |
|----|------------|---------|
| WO | 2010094989 | 8/2010  |

OTHER PUBLICATIONS

"Office Action of China Counterpart Application", issued on Apr. 7, 2015, pp. 1-11, in which the listed references were cited.

* cited by examiner

PERSONAL COMMUNICATION DEVICE AND METHOD FOR PRESENTING DIGITAL ITEMS THEREOF

BACKGROUND OF THE INVENTION

1. Field of the Invention

The present invention relates to a personal communication device (PCD). More particularly, the present invention relates to a method for presenting digital items on the PCD.

2. Description of the Related Art

Tags are pieces of digital information, usually text, associated with digital contents, such as pictures, URL links, calendar events, and so on. A digital content can have multiple tags to provide meta-information for easy searching, classification, and so on. People tags are tags carrying the information of people, such as their names, nicknames, aliases or digital identifiers such as email addresses. Tag suggestions are used to help people for tagging digital contents by providing them meaningful tags to choose and save them the efforts to create tags on the fly. One purpose of tagging is to associate digital contents with people. For example, a picture of several people together can have tags of their names. Adding tags of people can be a tedious work. Current tag suggestion systems relying on tagging history or face recognition all have their limitations.

SUMMARY OF THE INVENTION

Accordingly, the present invention is directed to a PCD and a method for presenting digital items such as tags or digital contents on the PCD. The present invention can detect nearby PCDs based on wireless detection or notification provided by a server, and rank digital items based on the presence of the nearby PCDs.

According to an embodiment of the present invention, a method for presenting digital items is provided. The method is executed by a first PCD and includes the following steps. Detect the existence of one or more second PCDs by the first PCD. Update the state of each said second PCD according to the detection. Rank the order of the one or more second PCDs according to the state, wherein the order of the second PCDs whose state is present is higher than the order of the second PCDs whose state is absent. Present one or more digital items according to the order of the one or more second PCDs.

According to another embodiment of the present invention, a PCD is provided. The PCD includes a communication interface, a processor, a user interface, and a storage device. The communication interface is configured to communicate with a second PCD or a server connected to the PCD. The processor is coupled to the communication interface. The processor is configured to determine the existence of the second PCD, update the state of the second PCD according to the existence of the second PCD, and provide one or more digital items according to the state of the second PCD. The user interface is coupled to the processor and is configured to present the one or more digital items. The storage device is coupled to the processor and is configured to store the state of the second PCD.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
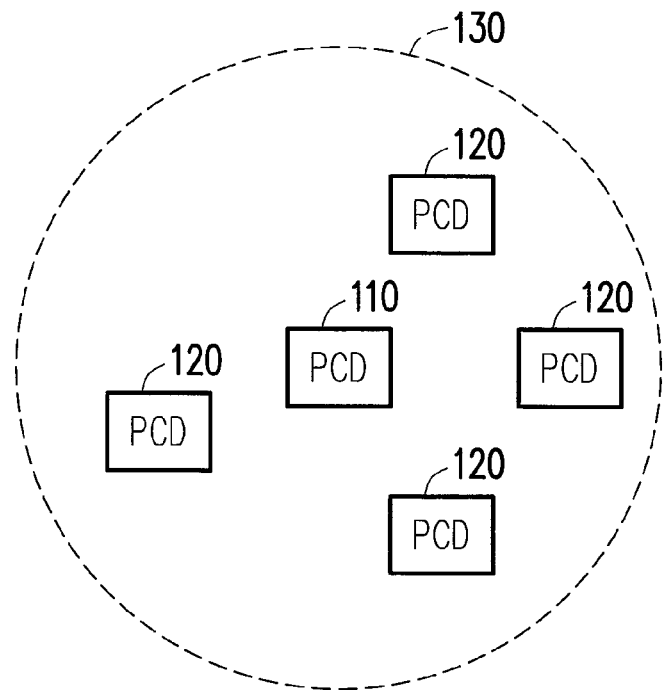
FIG. 1 is a schematic diagram showing a plurality of PCDs according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic diagram showing an application environment of a PCD 110 according to an embodiment of the present invention. FIG. 1 shows the PCD 110 and some other PCDs 120. The PCDs 110 and 120 may be smart phones or personal digital assistants (PDAs) carried by their respective owners. The PCDs 110 and 120 support a peer-to-peer wireless protocol such as Near Field Communication (NFC), WIFI Direct or Bluetooth, etc. Therefore, the PCDs 110 and 120 have peer-to-peer communications capabilities. When the PCDs 110 and 120 are in a predetermined range 130, the PCDs 110 and 120 are able to detect one another and communicate directly with one another without the help of communications infrastructure such as access points or base stations. In this embodiment, the predetermined range 130 is the operation range of the peer-to-peer wireless protocol centered at the PCD 110.

Figure 2:
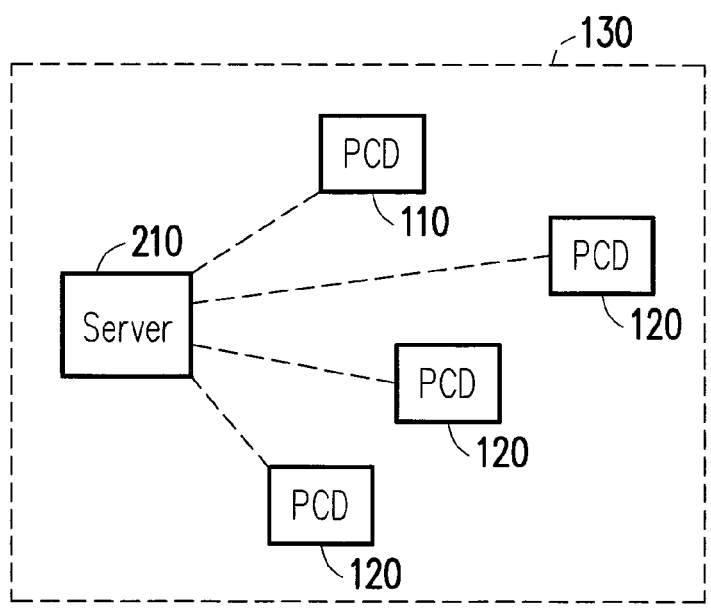
FIG. 2 is a schematic diagram showing a server and a plurality of PCDs according to an embodiment of the present invention.

FIG. 2 is a schematic diagram showing another application environment of the PCD 110 according to another embodiment of the present invention. FIG. 2 shows a server 210, the PCD 110, and some other PCDs 120. When the PCDs 110 and 120 are in a predetermined range 130, the PCDs 110 and 120 can connect to the server 210 and know the presence of one another based on notifications provided by the server 210 to the PCDs 110 and 120. In this embodiment, the predetermined range 130 is the serving range of the server 210.

Figure 3:
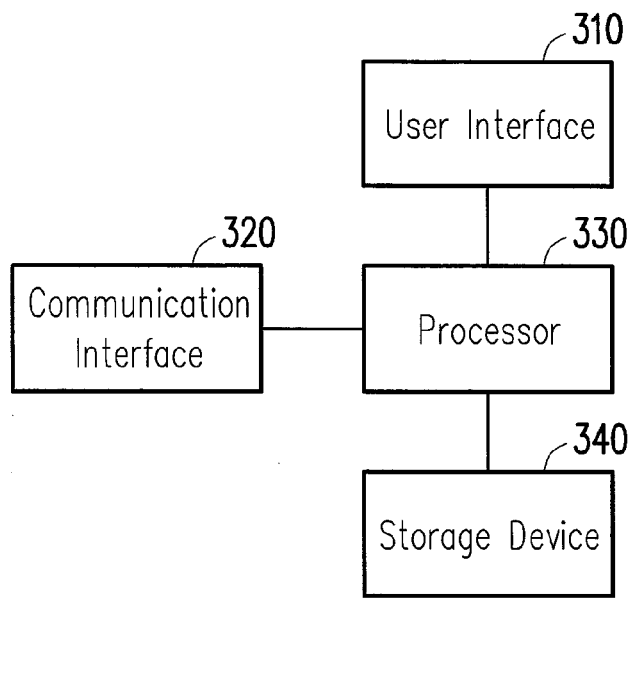
FIG. 3 is a schematic diagram showing a PCD according to an embodiment of the present invention.

FIG. 3 is a schematic diagram showing the PCD 110 according to an embodiment of the present invention. The PCD 110 includes a processor 330, a communication interface 320, a user interface 310, and a storage device 340. The processor 330 is coupled to the communication interface 320, the user interface 310, and the storage device 340. The user interface 310 may be any device capable of presenting digital items to the owner of the PCD 110 and receiving input from the owner of the PCD 110, such as a touch display. The digital items may include digital information or digital contents. When used in the environment shown in FIG. 1, the communication interface 320 may be a wireless communication circuit for detecting the PCDs 120 and communicating with the PCDs 120, and the processor 330 may perform a mutual detection through the communication interface 320 to detect the other PCDs 120. When used in the environment shown in FIG. 2, the communication interface 320 may be a network interface circuit for connecting to the server 210. Yet in another embodiment of the present invention, the communication interface 320 may be capable to communicate with both the PCDs 120 and the server 210.

Figure 4:
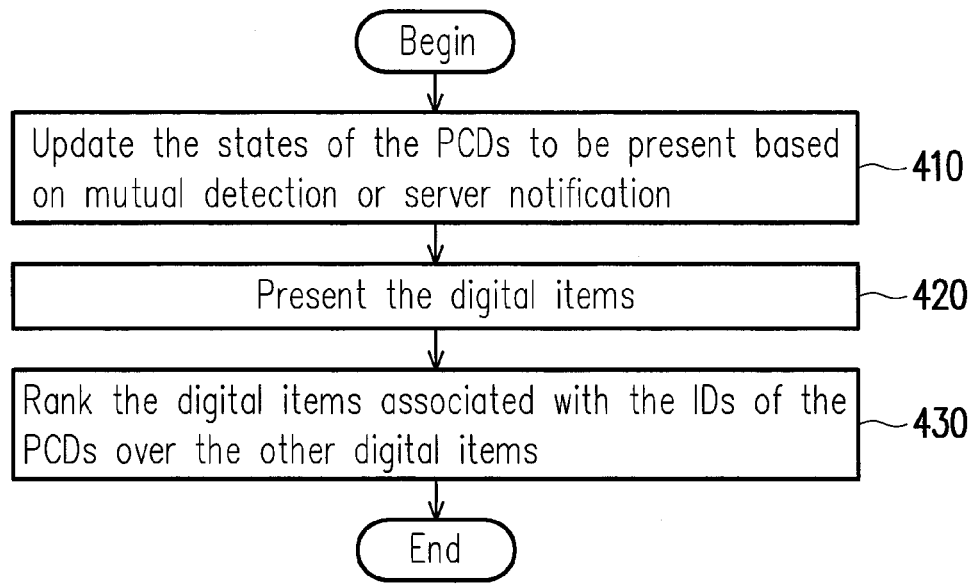
FIG. 4 to FIG. 7 are flow charts showing a method for presenting digital items according to an embodiment of the present invention.

FIG. 4 is a flow chart showing a method for presenting digital items according to an embodiment of the present invention. The method for presenting digital items may be executed by the processor 330 of the PCD 110. In this embodiment, the PCD 110 records a state for each PCD 120. The state may be present or absent. The present state means the corresponding PCD 120 exists in the predetermined range 130, while the absent state means the corresponding PCD 120 does not exist in the predetermined range 130, or simply cannot be detected or identified. The predetermined range 130 may be relatively small so that a PCD 120 is near the PCD 110 when the PCD 120 is in the predetermined range 130.

The PCD 110 may execute the method for presenting digital items for one or more PCDs 120. When one or more PCDs 120 appear in the predetermined range 130 in FIG. 1, at step 410, the processor 330 updates the state of each PCD 120 to be present based on the mutual detection performed by the processor 330 and the second PCD 120 according to the peer-to-peer wireless protocol. When one or more PCDs 120 appear in the predetermined range 130 in FIG. 2, at step 410, the processor 330 updates the state of each PCD 120 to be present when the processor 330 obtains the states of the PCDs 120 from one or more notifications provided by the server 210. The storage device 340 may store the states of the PCDs 120.

At step 420, the processor 330 may present some digital items to the owner of the PCD 110 on the user interface 310 so that the owner of the PCD 110 can browse the digital items or make selection. In this embodiment, each PCD 110 or 120 has a unique ID for identifying each PCD 110 or 120. Each digital item presented by the processor 330 may be associated with the ID of a PCD 120 or not associated with the ID of any PCD 120. At step 430, in the aforementioned presenting, the processor 330 ranks the digital items associated with the IDs of the PCDs 120 prior to the digital items not associated with the IDs of the PCDs 120. In other words, when the processor 330 presents two digital items and the first digital item is associated with the ID of at least one PCD 120 and the second digital item is not associated with the ID of any PCD 120, the processor 330 ranks the first digital item above the second digital item. From another point of view, step 430 ranks the order of the PCDs and then ranks the digital items according to the order of their associated PCDs. The order of the PCDs 120 whose state is present is higher than the order of the other PCDs whose state is absent.

The digital items associated with the IDs of the PCDs 120 may be user names, contact names, nicknames, aliases, or email addresses of the owners of the PCDs 120, or account names of services used by the owners of the PCDs 120, or tags that have been used before by the owner of the PCD 110 and are associated with the owners of the PCDs 120, or digital contents related to the owners of the PCDs 120. The digital items not associated with the IDs of the PCDs 120 may be similar digital items, but they are not associated with the ID of any PCD 120.

Since PCDs are usually carried by their owners, the presence of the PCDs often implies that their owners are also nearby. The owners of the PCDs 120 may be friends, classmates or colleagues of the owner of the PCD 110. Therefore, when the PCDs 120 are present in the predetermined range 130, the processor 330 of the PCD 110 may assign a higher rank to the digital items associated with the PCDs 120 to suggest the owner of the PCD 110 to consider those digital items first.

The processor 330 may handle the ranking of digital items differently in different applications with regards to different kinds of digital items. For example, when the owner of the PCD 110 is tagging a picture of his friends, the processor 330 may rank the tags associated with his/her friends whose PCDs are near by placing those tags before the other tags not associated with his/her friends so that the owner of the PCD 110 can select the associated tags more conveniently. For another example, when the owner of the PCD 110 is browsing some pictures, the processor 330 may rank the pictures associated with his/her friends whose PCDs are near by placing the associated pictures before the other pictures, highlighting the associated pictures, or displaying the associated pictures in a more conspicuous manner so that the owner of the PCD 110 can notice the associated pictures and select them faster.

Figure 5:
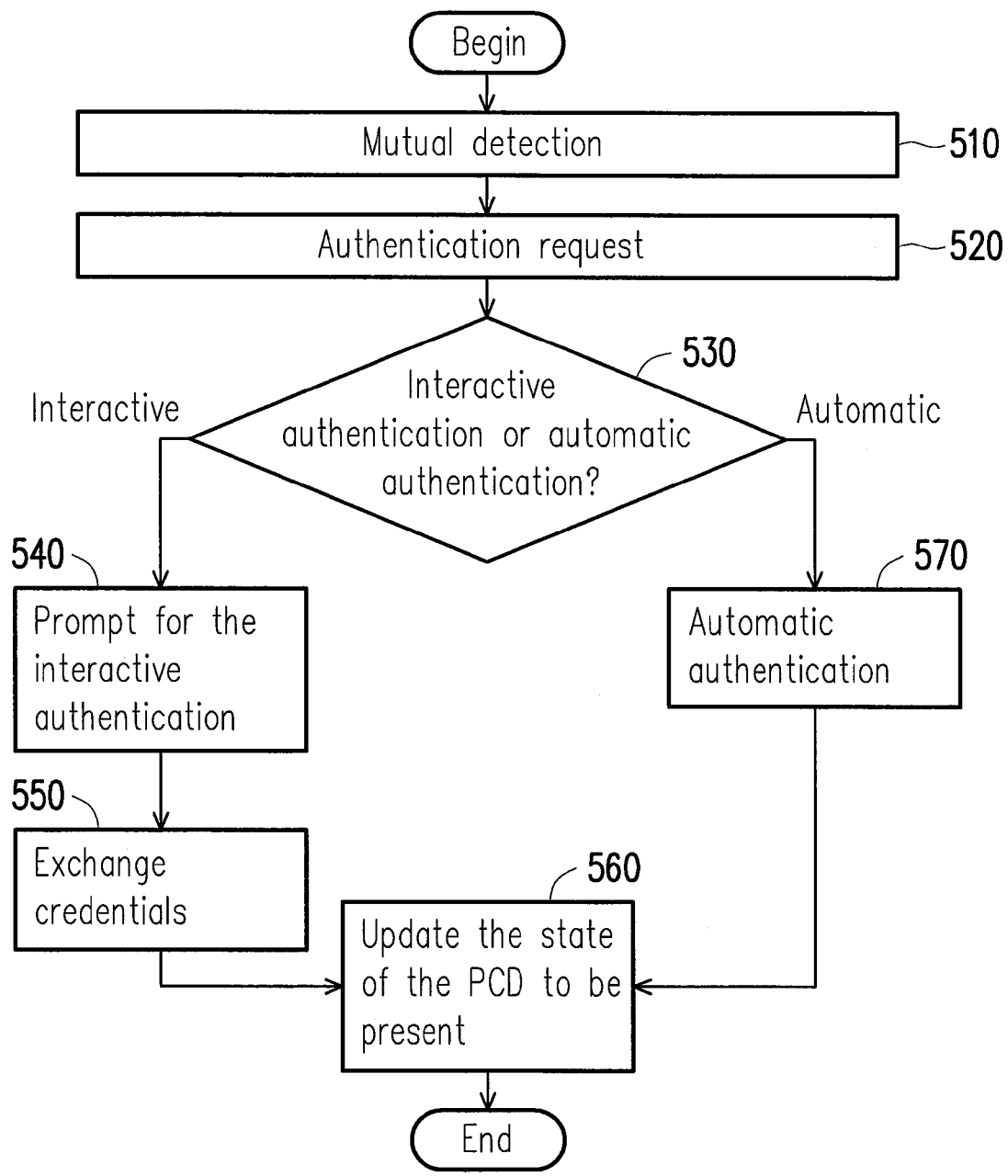

The PCD 110 may identify the owner of a detected PCD 120 by authentication. This authentication may be a mutual authentication so that the PCDs 110 and 120 can authenticate each other and identify the owner of each other. FIG. 5 is a flow chart showing the authentication in the environment in FIG. 1 according to an embodiment of the present invention.

The PCDs 110 and 120 may perform the mutual detection at step 510 to try to detect each other, which means the PCD 110 may actively detect its surroundings by trying to connect to one or more nearby PCDs 120, or the PCD 110 may passively wait for a PCD 120 to detect it, or does both, detecting and being detected, concurrently. When one of the PCDs 110 and 120 detects the other one of the PCDs 110 and 120 during the mutual detection, the detecting one of the PCDs 110 and 120 sends an authentication request to the detected one of the PCDs 110 and 120 at step 520. The authentication request starts the mutual authentication.

At step 530, the processor 330 determines whether to perform an interactive authentication or an automatic authentication. The first time a detected PCD is to be associated with a person (the owner), it often requires the confirmation of the owner of the detecting PCD to proceed. Therefore, at step 540, the processor 330 prompts the user interface 310 for an interactive authentication between the owners of the PCDs 110 and 120. The PCDs 110 and 120 can authenticate each other through interactive operations by their owners. When the interactive authentication is completed, at step 550, the PCDs 110 and 120 generate credentials respectively, securely exchange the credentials, and store the credentials of each other. The processor 330 may store the credentials of the PCD 120 in the storage device 340.

Later, when the PCD 120 enters the predetermined range 130 again, the PCD 110 detects the PCD 120 and/or the PCD 120 detects the PCD 110 again. The processor 330 may use the credentials exchanged previously to perform an automatic authentication with the PCD 120 at step 570. The automatic authentication protocol does mutual authentication. The implementation of the automatic authentication depends on the security mechanism used by the PCDs 110 and 120.

After the interactive authentication or the automatic authentication is successfully completed, the PCDs 110 and 120 know the ID of each other and can recognize the owner of each other. The processor 330 can update the state of the PCD 120 to be present at step 560.

Figure 6:
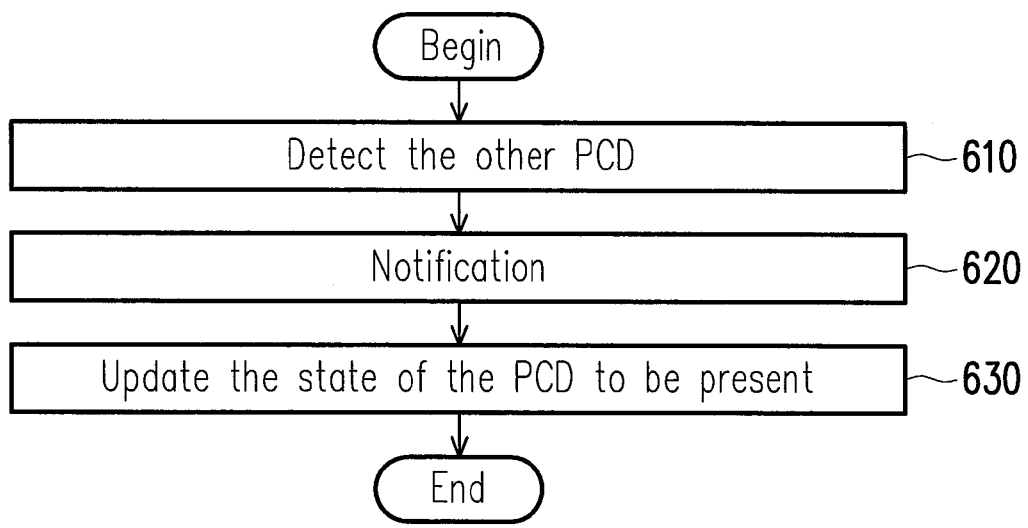

FIG. 6 shows a flow of updating the state of a PCD 120 without authentication in the environment in FIG. 1 according to an embodiment of the present invention. At step 610, one of the PCDs 110 and 120 detects the other one of the PCDs 110 and 120 when performing the mutual detection according to the peer-to-peer wireless protocol. At step 620, the detecting one of the PCDs 110 and 120 notifies the detected one of the PCDs 110 and 120 of the detection according to the peer-to-peer wireless protocol. At step 630, the processor 330 updates the state of the PCD 120 to be present.

In this embodiment, the PCDs 110 and 120 may provide the identities of their owners directly to each other without authentication. For example, the identity of the owner may be sent along with the notification at step 620. The PCD receiving the notification at step 620 may return an acknowledgement so that the PCDs 110 and 120 can know the ID of each other and know the identity of the owner of each other.

In the environment in FIG. 2, the server 210 may send the IDs of the PCDs 120 in the predetermined range 130 to the PCD 110. The PCD 110 may use the IDs of the PCDs 120 to query the server 210 for the identities of the owners of the PCDs 120.

In the environment in FIG. 1, the PCD 110 may keep detecting nearby PCDs 120. The processor 330 may update the state of a PCD 120 to be absent when the processor 330 fails to detect the PCD 120 in the predetermined range 130, or when the processor 330 receives an implicit request or an explicit request from the PCD 120. When the PCD 120 disables the direct communications with the PCD 110 or when the PCD 120 closes the communications connection to the PCD 110, the PCD 110 may regard this as an implicit request for updating the state of the PCD 120 to be absent. In addition, the PCD 120 may send an explicit request to the PCD 110 for updating the state of the PCD 120 to be absent.

In the environment in FIG. 2, the server 210 may send a notification to the PCD 110 when one or more PCDs 120 no longer connect to the server 210. In response, the PCD 110 may update the state of the one or more PCDs 120 to be absent.

Figure 7:
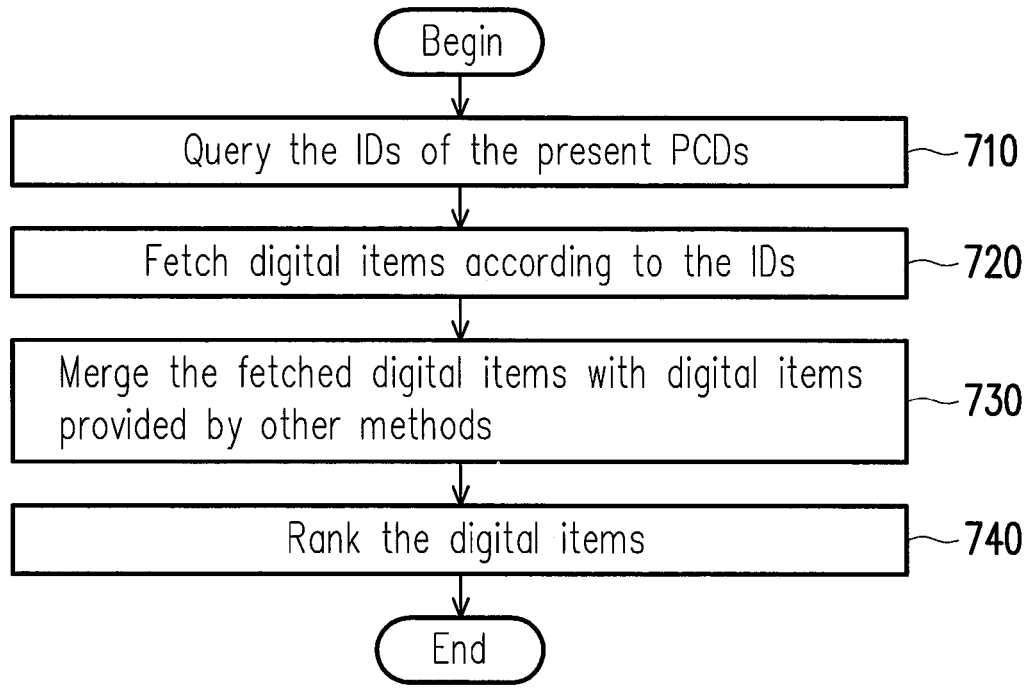

FIG. 7 is a flow chart showing some details of step 420 according to an embodiment of the present invention. At step 710, the processor 330 queries the IDs of the PCDs 120 whose state is present. The IDs of the present PCDs 120 may be stored in the storage device 340. At step 720, the processor 330 fetches the digital items associated with the IDs of the present PCDs 120. The processor 330 may fetch these associated digital items according to the IDs of the PCDs 120 whose state is present from the storage device 340, the PCDs 120, the server 210, another server connected to the PCD 110, or any combination of these sources.

At step 730, the processor 330 merges the digital items associated with the IDs of the present PCDs 120 with other digital items not associated with the IDs of the present PCDs 120. The other digital items may be provided by other methods. For example, when the owner of the PCD 110 is tagging a picture of his/her friends, the other digital items may be the tags suggested by a face recognition algorithm and the names of recognized people may be suggested as people tags. The other methods may be suggestion based on past history of the digital items, suggestion based on the history of use of the digital items, or any combination of the above.

At step 740, the processor 330 ranks the associated digital items (associated with present PCDs) over the other digital items (associated with absent PCDs or have no association). That means the digital items are ranked according to the ranked order of the PCDs associated with those digital items, wherein the order of present PCDs is prior to the order of absent PCDs. The associated digital items may be further ranked according to the aforementioned other methods. For example, an associated digital item that is also suggested by the aforementioned other methods may be ranked prior to another associated digital item that is not suggested by the aforementioned other methods.

In summary, the PCD and the method for presenting digital items provided by the present invention can provide better suggestions according the presence of nearby PCDs. Moreover, the PCD and the method for presenting digital items provided by the present invention can coexist with other suggestion methods to provide better suggestions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for presenting digital items, executed by a first personal communication device (PCD), comprising:
   detecting existence of one or more second PCDs by the first PCD;
   updating a state of each said second PCD according to the detection;
   ranking an order of the one or more second PCDs according to the state, wherein the order of the second PCDs whose state is present is higher than the order of the second PCDs whose state is absent; and
   presenting one or more digital items according to the order of the one or more second PCDs.

2. The method of claim 1, wherein the existence of the one or more second PCDs is detected based on performing a mutual detection according to a peer-to-peer wireless protocol within a predetermined range, and the predetermined range is an operation range of the peer-to-peer wireless protocol centered at the first PCD.

3. The method of claim 2, wherein the step of updating the state of the one or more second PCDs comprises:
   the first PCD and a said second PCD authenticating with each other by prompting for an interactive authentication between an owner of the first PCD and an owner of the said second PCD, or by an automatic authentication based on credentials exchanged between the first PCD and the said second PCD at completion of the interactive authentication.

4. The method of claim 3, wherein, prior to the first PCD and the said second PCD authenticating with each other, the step of updating the state of the one or more second PCDs further comprises:
   one of the first PCD and the said second PCD detecting the other one of the first PCD and the said second PCD when performing the mutual detection; and
   the detecting one of the PCDs sending an authentication request to the detected one of the PCDs.

5. The method of claim 2, wherein the step of updating the state of the one or more second PCDs comprises:
   one of the first PCD and a said second PCD detecting the other one of the first PCD and the said second PCD when performing the mutual detection according to the peer-to-peer wireless protocol; and
   the detecting one of the PCDs notifying the detected one of the PCDs of the detection according to the peer-to-peer wireless protocol.

6. The method of claim 1, wherein the existence of the one or more second PCDs is detected by a notification provided by a server.

7. The method of claim 1, further comprising:
   updating the state of a said second PCD to be absent in response to failing to detect the said second PCD in a predetermined range, or in response to receiving an implicit request or an explicit request from the said second PCD, or based on another notification provided by a server connected to the first PCD.

8. The method of claim 1, wherein the one or more digital items comprise at least one digital item associated with the one or more second PCDs and at least one digital item provided by other methods, and the presenting of the one or more digital items further comprises:

ranking the digital items according to the order of the one or more second PCDs and the other methods in combination, wherein the other methods comprise at least one of suggestion based on past history of the digital items, suggestion based on history of use of the digital items, and face recognition.

9. The method of claim 1, wherein each of the one or more digital items is a user name, a contact name, a nickname, an alias, an email address of an owner of the one or more second PCDs, or an account name of a service used by the owner of the one or more second PCDs, or a tag that has been used before by an owner of the first PCD and is associated with the owner of the one or more second PCDs, or a digital content related to the owner of the one or more second PCDs.

10. The method of claim 1, wherein the detecting is performed based on at least one of a long range wireless protocol and a short range wireless protocol, the short range wireless protocol is selected from Near Field Communication (NFC), Wi-Fi Direct and Bluetooth.

11. A personal communication device (PCD), comprising:
a communication interface, configured to communicate with a second PCD or a server connected to the PCD;
a processor, coupled to the communication interface, and configured to determine existence of the second PCD, update a state of the second PCD according to the existence of the second PCD, and provide one or more digital items according to the state of the second PCD;
a user interface, coupled to the processor, configured to present the one or more digital items; and
a storage device, coupled to the processor and configured to store the state of the second PCD.

12. The PCD of claim 11, wherein the state of the second PCD is updated based on performing the mutual detection according to a peer-to-peer wireless protocol within a predetermined range, and the predetermined range is an operation range of the peer-to-peer wireless protocol centered at the PCD.

13. The PCD of claim 12, wherein in order to update the state of the second PCD, the PCD and the second PCDs authenticate with each other, the processor prompts on the user interface for an interactive authentication between the owner of the PCD and an owner of the second PCD, or the processor performs an automatic authentication with the second PCD based on credentials exchanged between the PCD and the second PCD at completion of the interactive authentication.

14. The PCD of claim 13, wherein, prior to the PCD and the second PCD authenticating with each other, one of the PCD and the second PCD detects the other one of the PCD and the second PCD when performing the mutual detection, and then the detecting one of the PCDs sends an authentication request to the detected one of the PCDs.

15. The PCD of claim 12, wherein one of the PCD and the second PCD detects the other one of the PCD and the second PCD when performing the mutual detection according to the peer-to-peer wireless protocol, the detecting one of the PCDs notifies the detected one of the PCDs of the detection according to the peer-to-peer wireless protocol, and the processor updates the state of the second PCD to be present.

16. The PCD of claim 11, wherein the processor obtains the state of the second PCD from the notification provided by the server.

17. The PCD of claim 11, wherein the processor updates the state of the second PCD to be absent in response to the processor failing to detect the second PCD in the predetermined range, or when the processor receives an implicit request or an explicit request from the second PCD, or based on another notification provided by the server connected to the PCD.

18. The PCD of claim 11, wherein the one or more digital items comprise at least one digital item associated with the second PCD and at least one digital item provided by other methods, the processor is further configured to rank the digital items according to the state of the second PCD and the other methods in combination, wherein the other methods comprise at least one of suggestion based on past history of the digital items, suggestion based on history of use of the digital items, and face recognition.

19. The PCD of claim 11, wherein each of the one or more digital items is a user name, a contact name, a nickname, an alias, an email address of an owner of the second PCD, or an account name of a service used by the owner of the second PCD, or a tag that has been used before by an owner of the PCD and is associated with the owner of the second PCD, or a digital content related to the owner of the second PCD.

20. The PCD of claim 11, wherein the communication interface supports at least one of a long range wireless protocol and a short range wireless protocol, the short range wireless protocol is selected from Near Field Communication (NFC), Wi-Fi Direct and Bluetooth.

* * * * *